May 6, 1947.    H. A. SPRENGER ET AL    2,420,153
FLEXIBLE EXHAUST CONDUIT ASSEMBLY
Filed Dec. 3, 1943
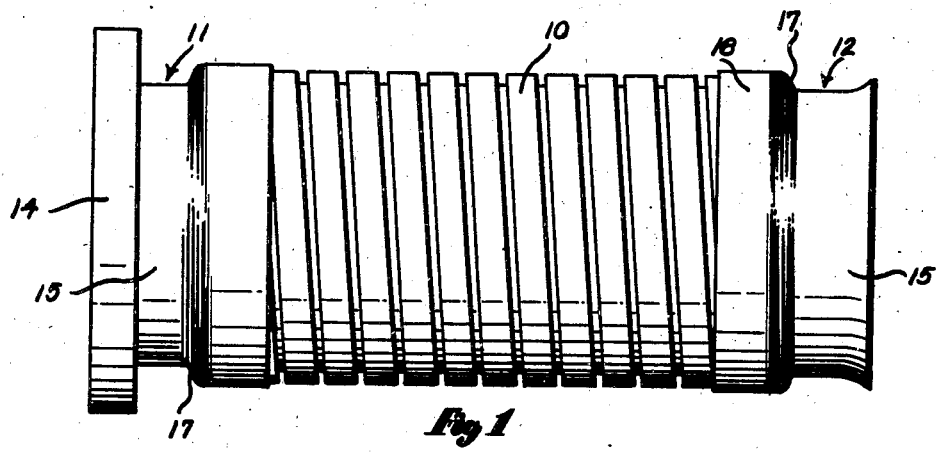
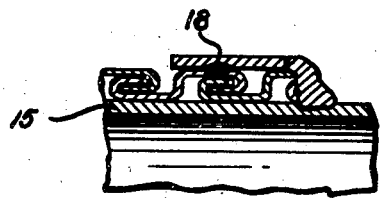
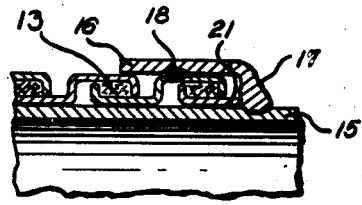
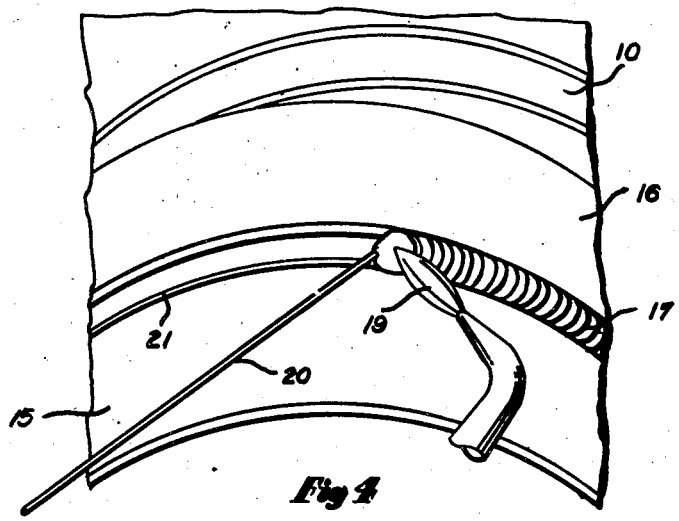
INVENTORS
HAROLD A. SPRENGER
and JOSEPH R. GREENE
BY
E. Woodbury
ATTORNEY.

Patented May 6, 1947

2,420,153

UNITED STATES PATENT OFFICE 2,420,153

FLEXIBLE EXHAUST CONDUIT ASSEMBLY

Harold A. Sprenger and Joseph R. Greene, San Diego, Calif., assignors to Solar Aircraft Company, San Diego, Calif., a corporation of California Application December 3, 1943, Serial No. 512,744

1 Claim. (Cl. 285—72)

This invention relates to flexible exhaust conduits for aircraft engines and particularly to exhaust conduits of the type consisting of a helical metal strip having overlapping interlocking turns and commonly referred to as flex tubing.

An object of the invention is to provide a strong and leak-proof joint between a length of flex tubing and a terminal fitting therefor.

A more specific object is to provide a strong, leak-proof and durable welded joint between a piece of flex tubing and a terminal fitting therefor.

Other more specific objects and features of the invention will appear from the detailed description to follow of a particular embodiment of the invention.

Flex tubing constructed of some heat and corrosion-resistant material, such as stainless steel or inconel, is very well adapted for making connections between relatively movable parts of the exhaust system of an aeroplane, because of its free flexing characteristics. However, difficulty has been encountered in joining the ends of the flex tubing to the associated parts of the exhaust system. Heretofore it has been attempted to attach flex tubing to a terminal fitting by providing on the latter a sleeve which telescopically engaged the flex tubing and then welding or brazing the overlapping end portion of the flex tubing to the sleeve. However, difficulty was encountered due to the relative thinness of the flex tubing material, the material burning or melting back a substantial distance from the end when the flame was applied thereto, this melting back occurring before the heavier material of the telescoping sleeve could be raised to the fusing temperature. Attempts have been made to prevent this destruction of the thin flex tubing material by employing brazing metals or alloys having substantially lower fusing temperatures than the tubing material, but this did not satisfactorily solve the problem. In the first place, it did not entirely eliminate excessive burning back of the flex tube material and, in the second place, the joint produced by the brazing materials was not as satisfactory under high operating temperatures as a true weld.

In accordance with the present invention, we easily obtain a strong and leak-proof weld connection between flex tubing and a sleeve terminal connection therefor by providing an additional short sleeve on the opposite side of the flex tube from the terminal connection. Thus, it is usually desirable to telescope the terminal fitting within the flex tubing, and in such construction we provide an additional short sleeve or collar surrounding the flex tubing at the end thereof and then weld the end edges of the external collar and the flex tubing to the exterior surface of the terminal fitting. Because of the fact that the end portion of the flex tubing is sandwiched between the relatively heavy terminal fitting and collar, the flex tubing is protected from the welding flame so that it is not excessively heated and melted before the metal of the terminal fitting and of the collar is fused, and the molten metal of the weld bonds thoroughly with the metal of the flex tube adjacent the end thereof.

In the drawing:

Fig. 1 is a side elevation view of a flexible exhaust hose assembly in accordance with the invention;

Fig. 2 is a detail longitudinal section through one of the weld connections of Fig. 1, the view showing a form of flex tubing having a packing therein;

Fig. 3 is a detail section similar to Fig. 2 but showing a flex member having no packing; and Fig. 4 is a perspective view showing how the welded joint of Figs. 1, 2 and 3 is made.

Referring first to Fig. 1, there is shown a short section 10 of flex tubing having secured to its opposite ends a pair of terminal fittings 11 and 12, respectively.

The flex tubing 10 may be of standard construction in which a thin, rather narrow ribbon of metal is folded and rolled into a helix of overlapping interlocking turns. The shape of the ribbon employed in a packed hose may be as shown in Fig. 2 in which a packing 13 is rolled with the formed ribbon. The shape of the ribbon in a hose having no packing may be as shown in Fig. 3. These types of flex tubing do not constitute a part of the present invention.

The terminal fittings may be of various shapes, according to the design of the structure of which the flex tubing forms a part. In Fig. 1, the terminal connection 11 has a flange 14 which may be bolted to a cooperating flange on an element to which the connection is to be attached. The terminal connection 12 is adapted to telescope with another tube (not shown) to form a slip connection. However, insofar as the present invention is concerned, it is merely necessary that the terminal connection have a nipple 15 adapted to telescope snugly within the end of the flex tube 10 for an appreciable distance, usually not less than one-half inch, although it may be substantially more if desired. The nipple 15 is then welded to the end of the flex tube 10 and to a collar 16, which surrounds the flex tubing and has its outer end approximately flush with the end of the flex tubing. As shown in Figs. 2 and 3, the weld metal 17 is solidly fused to the surface portion of the nipple 15 and with the outer edge of the collar 16 and flows in and about and is fused to the thin metal of the flex tubing.

A convenient method of forming the joint just described is to first position the collar 16 on the end of the flex tubing 10 and then insert the nipple 15. The collar 16 may be temporarily secured to the end of the flex tubing by spot welding it thereto as indicated at 18, several spots being made at circumferentially spaced points, or the collar may be so dimensioned as to fit snugly on the flex tubing and thereby remain in position. It is desirable to secure the collar to the flex tubing in some manner to insure that at the time the weld is made, the end of the flex tubing will either be flush with or will project slightly beyond the end of the collar 16, in order to insure a bond between the weld metal and the flex tubing at all circumferential points.

After the collar 16 has been mounted on the flex tubing 10 and the nipple 15 has been inserted, the weld can be formed with a welding flame 19 and a weld rod 20 as illustrated in Fig. 4 in which the welding operation proceeds from right to left. It will be observed from Fig. 4 that although the thin edge 21 of the flex tubing does not completely fill the space between the nipple 15 and the collar 16, it is nevertheless protected from excessive heating by the flame 19 because of its proximity to the heavier members 15 and 16 so that the edge does not burn away but remains intact during the welding operation and is solidly bonded to the weld metal 17.

In exhaust structures for aeroplanes and the like the flex tubing 10, the tubular section 15 and the external sleeve 16 are all preferably formed of the same material, which may be stainless steel or inconel. Likewise, the additional weld metal supplied by the rod 20 is preferably of the same material.

The material of the flex tubing may vary in thickness but is usually approximately .020" thick. The nipple 15 and the collar 16 should be of thicker material and it has been found that very satisfactory joints result when these members are approximately .050" thick.

It is to be specifically understood that the invention is not limited to use with the particular terminal fittings shown in the drawing, those serving merely as examples. The only essential feature of the terminal fitting is that it connect to the flex tubing by means of a nipple extending thereinto.

Other variations and departures from the exact construction shown and described can be made without departing from the invention which is to be limited only to the extent set forth in the appended claim. For example, the flex tubing might consist of a plurality of individual rings instead of a continuous helical strip.

We claim:

A flexible conduit assembly comprising: a section of flexible metal tubing consisting of interlocking turns of thin sheet metal; a terminal fitting having a metal nipple telescoped within the end portion of said tubing and of substantially greater thickness than said thin sheet metal of said tubing; a metal collar also of substantially greater thickness than said thin sheet metal and surrounding the end portion of said tubing, the outer end of said collar being substantially flush with the end of said tubing; and an annular fillet of weld metal extending from said nipple to said collar and fused to said nipple, collar and tubing, at least said tubing and fillet being of metal having the same fusing temperature.

HAROLD A. SPRENGER.
JOSEPH R. GREENE.

REFERENCES CITED

The following references are of record in the file of this patent:

UNITED STATES PATENTS

| Number | Name | Date |
|---|---|---|
| 2,240,413 | Parker | Apr. 29, 1941 |
| 1,340,818 | Brinkman | May 18, 1920 |
| 1,684,554 | Riefenstahl | Sept. 18, 1928 |
| 1,129,979 | Hewitt et al. | Mar. 2, 1915 |
| 1,939,242 | Thaheld | Dec. 12, 1933 |
| 2,040,140 | Kidd | May 12, 1936 |
| 2,322,924 | Daiger | June 29, 1943 |

FOREIGN PATENTS

| Number | Country | Date |
|---|---|---|
| 356,921 | French | 1905 |
| 12,482 | British | May 20, 1914 |

OTHER REFERENCES

Publication: The Welding Encyclopedia—Tenth Edition, published by The Welding Engineer Publishing Co. (Copy available in Div. 14, p. 517.)